Figure 1:
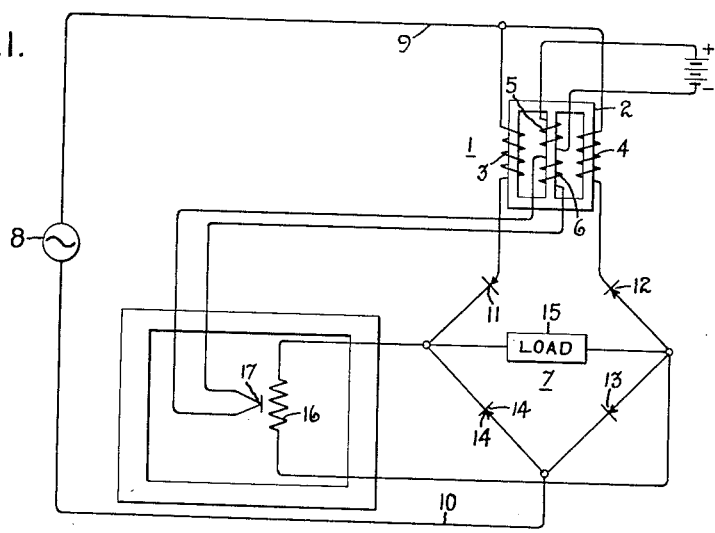

Jan. 31, 1956  H. M. OGLE  2,733,404
THERMAL TIME-CONSTANT CIRCUIT
Filed Nov. 27, 1951

Inventor:
Hugh M. Ogle,
by Paul A. Frank
His Attorney.

United States Patent Office 2,733,404
Patented Jan. 31, 1956

2,733,404

THERMAL TIME-CONSTANT CIRCUIT

Hugh M. Ogle, Schenectady, N. Y., assignor to General Electric Company, a corporation of New York Application November 27, 1951, Serial No. 258,497

13 Claims. (Cl. 323—70)

The present invention relates to electroresponsive time-control circuits, and more particularly to devices which employ a long time-constant regulating or reset action for stabilizing electrical control circuits.

In electrical control circuits such as servo type systems or feedback loop signal systems resistance-capacitance devices are generally used to control the electric signal output over a period of time. However, in such systems a long time-constant reset action is frequently desirable, and resistance-capacitance devices are generally too expensive and too bulky when a time-constant of more than a second or so is desired, especially in the case of low impedance networks. In order to get the desired long time-constant for such systems devices which are primarily mechanical in nature must frequently be used. These mechanical devices are usually of the on-off type and are not sufficiently versatile in their characteristics to be well suited for controlling an electric signal output. Consequently, in many electrical control systems there is a great need for a circuit capable of providing a long time-constant reset action for stabilizing and controlling the signal output.

Accordingly, it is an object of my invention to provide an electroresponsive long time-constant circuit for controlling an electrical signal output.

Another object of my invention is to provide a stabilizing device for control circuits.

A further object of my invention is the provision of a thermal reset circuit arranged to provide a long and adjustable time-constant reset action.

A still further object of my invention is the provision of a device for controlling an electrical output over a period of time in accordance with a predetermined function of time.

In carrying out my invention in one form, I provide, in an electrical control circuit, an electric heater device responsive to either the output current or voltage of the control circuit, in association with a thermal sensitive element capable of producing an electrical output in response to temperature changes. This thermal sensitive device, which may, for example, be a thermocouple, may be so connected as to either add to or subtract from the signal voltage to the electrical control system, as desired. For example, the thermal responsive device could be connected to a control winding on a saturable core type magnetic amplifier, with the electric heater being connected in the feedback loop of the amplifier. If a high steady-state value of output signal is desired, the thermocouple control winding would be made additive to the regular signal winding of the amplifier, while to obtain a high transient output current and a low steady-state current the thermocouple control winding should oppose the signal winding. With such a device a wide range of time-constants can be obtained. The time required for heating the electric resistance heater is easily adjusted according to the choice of resistance wire in the heater; moreover the time for the heat to be conducted to the thermal responsive element is adjustable by varying the distance from the heater to the element or the conducting medium between them or both. Consequently, the time before the control signal is modified in response to the output signal may be made as long as several minutes.

My invention will be better understood from the following description taken in connection with the accompanying drawings and its scope will be pointed out in the appended claims.

Figure 2:
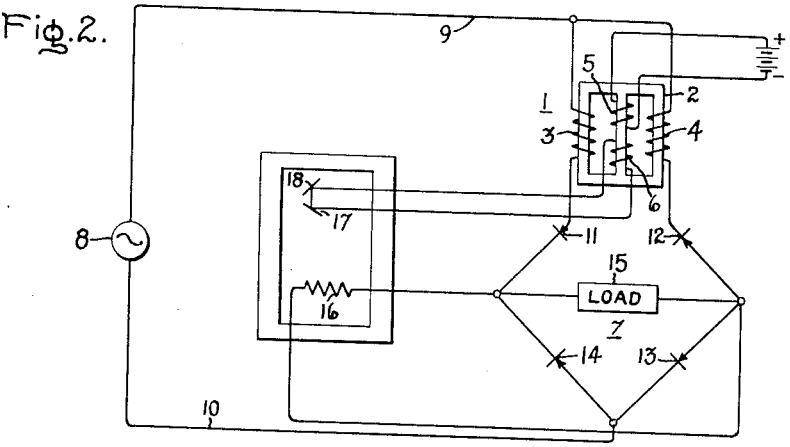
Figure 3:
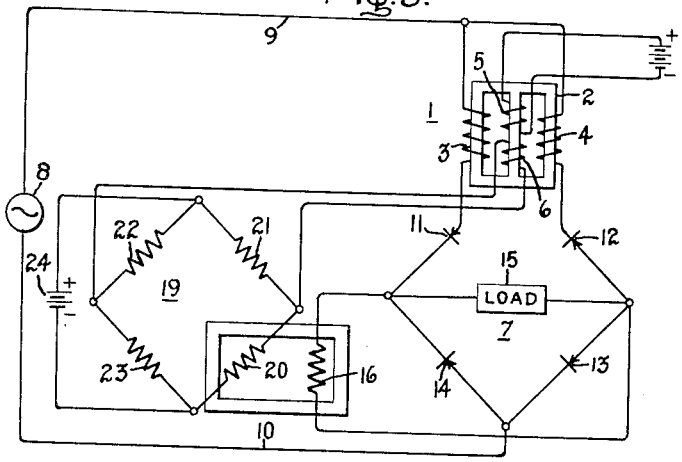

In the drawings, Fig. 1 is an electric circuit diagram of a magnetic amplifier control system in which my thermal time-control device is used as a stabilizing means, and in which the time-constant reset action is obtained by an electric heater in combination with a thermocouple; Fig. 2 is a modified electrical circuit diagram similar to Fig. 1 but in which a modified thermocouple arrangement is used; and Fig. 3 is another modified electrical circuit diagram similar to Fig. 1 but in which a resistance bridge temperature measurement system is shown in place of the thermocouple.

Referring now to Fig. 1 of the drawing, my invention is shown, for the purpose of illustrating one of its uses, with a magnetic amplifier control circuit. It should be understood, of course, that my stabilizing device is not limited to such application but can advantageously be used with many different types of control circuits such as electronic amplifiers, amplidynes, etc. The control circuit shown in Fig. 1 to illustrate my invention includes a magnetic amplifier 1 of the saturable core type which in the form shown has a closed three-legged magnetic core 2, formed preferably of a material having a relatively high permeability. On the outer legs of core 2 are located load windings 3 and 4 respectively, while the center leg is equipped with two control windings 5 and 6. The load windings 3 and 4 may be connected, in circuit with a bridge type full-wave rectifier 7 to a source of alternating current electrical energy 8 which supplies current to conductors 9 and 10. The operation of full-wave rectifier 7, which is composed of four unidirectional conducting devices 11, 12, 13, 14 is explained in detail later. The load windings 3 and 4 are arranged on core 2 so that the unidirectional components of magnetic flux produced by current in the windings have the same direction, such as upward, in the outer legs and have the same mutually additive direction, such as downward, in the control winding containing center leg of core 2. Control windings 5 and 6 of the center leg are connected, for purposes of illustration, so that the magnetomotive forces produced by these two windings oppose each other. As will be explained further hereinafter, whether the windings 5 and 6 are made opposing or additive and whether a single winding may be used depends primarily on whether a low transient output signal and a high steady-state signal is desired, or whether a high transient output signal and a low steady-state signal is desired.

If the source of alternating current only were operating, then there would be no saturation of magnetic core 2 and, therefore, no flux in the core at the instant that the voltage wave of the alternating current supply rose from the negative portion of the cycle to zero. Then, as the voltage increased and began a positive half-cycle, the current in one load winding, for example, winding 3, would produce flux in the magnetic core 2. This flux would increase as the voltage increased during the positive half-cycle in the manner similar to a transformer, reactor, or other such device. During the time that the flux would be increasing, before the saturation point of the core were reached, substantially all the voltage drop between conductors 9 and 10 would occur across load winding 3. As soon as the saturation point were reached, however, the current delivered in the load circuit would be limited only by the air core inductance of load winding 3 and the impedance of the load itself. The core then being saturated, there would no longer be any change in flux linkages to impede the flow of current through the load winding. Consequently, the presence of the core would not now affect the reactance of the load winding. The current through the load winding would lag slightly in the phase of the alternating potential while this potential returned to zero at the end of the positive half of the cycle. The rectifier would prevent the reversal of current and during the next half cycle of voltage the flux produced by the winding 3 would return to zero. During this next half cycle, however, load winding 4 on the other opposite leg of the amplifier core would repeat the operation just described so that current would flow through one load winding or the other during a portion of each half cycle.

It will be readily understood that when control windings 5 and 6 are energized with unidirectional current, the point during a voltage half cycle at which magnetic core 2 saturates is changed. If the net flux produced by the control windings is such that it opposes the flux produced by the load windings, the core saturates at a later point during the half cycle, which reduces the interval during which the load winding conducts current and, as a result, reduces the average load current. Conversely, if the control flux adds to the flux produced by the load winding, the core saturates earlier in the cycle and the load current is increased. In the application of my circuit shown in Fig. 1, the load current will increase as the variable signal current increases. Control winding 5 is connected to a signal source of direct current potential and is so wound that the flux produced adds to the flux produced by the load windings 3 and 4, while control winding 6, which is connected in a manner hereinafter explained, is of opposite polarity so that the flux produced by this winding opposes the flux produced by the reference signal winding and the load windings, and thus supplies what may be termed a negative signal.

The magnetic amplifier described above is not my invention but instead merely illustrates a control of the type to which my stabilizing device has been advantageously applied.

As shown in Fig. 1 the output terminals of the conducting members 11 and 14 and 12 and 13 of the rectifier 7 are respectively connected, and across these terminals is connected an electrical load 15 which may, for example, be a motor field, an electric heater, or other such device. The load or signal output current is, of course, equal to the current flowing through the load windings and it is either this signal output current or the signal output voltage which is to be modified by my time-constant device. As will be explained more fully hereinafter, my stabilizing means is current responsive if the heater element is connected in series with the load or output signal and is voltage responsive if the heater is connected in parallel, as shown in Fig. 1, with the load or output signal.

Again referring to Fig. 1, I have shown an electric resistance type heater 16 connected in parallel circuit relation with the load 15, so that the thermal output of the heater is responsive to the output signal voltage of the magnetic amplifier 1. By varying the thermal capacity of the heater 16, the time of response of the heater can be readily controlled. Associated with the heater 16 and preferably in the same enclosure therewith is a thermally sensitive element, which is illustrated in Fig. 1 as a thermocouple 17 of two dissimilar metals. The thermocouple 17 is, in the usual manner, productive of a voltage in response to terminal temperature. It provides the signal voltage for the control winding 6 which, as previously explained, opposes the effect of the reference signal winding 5. The time of response of the thermocouple 17 to the heat generated in the heater 16 can also be effectively controlled. A careful choice of the conducting medium between the heater and the thermocouple terminal as well as of the distance separating them can vary the time of response as desired. Consequently, the time-constant of the circuit including the heater 16, the thermocouple 17 and the winding 6 can readily be varied from a few seconds to several minutes as necessary for the particular control operation.

Assume that upon the initial operation of the circuit the thermocouple 17 is at a relatively low ambient temperature so that the current supplied to the winding 6 is negligible, while the signal current to the winding 5 remains at a predetermined fixed value. Since the winding 5 produces flux which is additive to that produced by the current flowing respectively in the load windings 3 and 4, the core 2 saturates earlier in each voltage half cycle than if only the load windings were energized. This, as previously explained, increases the average output of the magnetic amplifier. Consequently, the transient load current through the rectifier 7, passing on one half cycle through the load winding 3, the conductive member 11, the load 15, and the conductive member 13, and on the next half cycle through the conductive member 14, the load 15, the conductive member 12 and the load winding 4, is relatively high. Since the heater 16 is in parallel with the load 15, it will in a predetermined time reach a selected elevated temperature and, in a predetermined time depending upon the proximity of the thermocouple 17 and the nature of the conducting medium between the heater and thermocouple, will raise the thermocouple temperature to increase the thermocouple output and thereby increase the previously negligible current flowing through the control winding 6. This will cause a decrease in the net additive flux of the control windings and a resulting decrease in the load current and voltage. There will then be a corresponding decrease in the thermal output of the heater 16, and the thermocouple output will soon stabilize thereby causing the net flux of the windings 5 and 6 to stabilize at a predetermeined value. Consequently, after an initially high current and voltage output such as may be desired for certain applications, the steady-state current and voltage will be relatively low.

If the opposite effect is desired, my stabilizing device can readily produce it. For example, upon simply changing the direction of current flow through the winding 6, the flux generated will be additive to that of the winding 5. In this case the transient output current and voltage will be relatively low compared to the steady-state output current and voltage. The heater 16 will be energized in response to the output voltage and after its predetermined time lag will begin to heat thermocouple 17 and thereby will cause generation of a flux additive to that of the signal winding 5. The increased net additive flux of the control windings will add to that of the windings 3 and 4 to produce an earlier saturation of the core 2 and a higher average load current. Thus, the steady-state output will be greater, after the predetermined time lag caused by the time-constant device, than the transient output. It will be readily apparent that in many applications it is desirable to have the control circuit output initially low relative to the steady-state output. My invention not only provides this desired result but in addition it provides a means by which the time lag between the transient output and the steady-state output can be readily adjusted.

While I have illustrated in Fig. 1 a thermal time-constant circuit including a magnetic amplifier having two opposing control windings 5 and 6, it should be understood that the control winding 5 is not essential in applying my invention to a magnetic amplifier control system. A single control winding can be energized both by the signal potential and by the thermocouple 17 without changing the principle of operation.

In the modification illustrated in Fig. 2 I have shown my invention applied to a control circuit identical to that shown in Fig. 1, in order to simplify the explanation. The same reference numerals have been used to identify identical circuit components. My time-constant device is shown in Fig. 2 in a different form from that of Fig. 1, however in that a second thermocouple junction 18 has been included at a more remote point from the heater 16 than the thermocouple junction 17. The thermocouple 18 produces an opposing voltage to that of thermocouple 17 and as soon as the couple 18 reaches an equal temperature with that of the couple 17, assuming the same pair of metals is used at each junction, the total thermocouple output to the winding 6 becomes zero. Consequently, the addition of an extra thermocouple junction not only provides another adjustment by which the time-constant can be varied but in addition provides a means by which the effect of the stabilizer can be brought into play after a predetermined time and eliminated from the control circuit after a second predetermined time. Further, by having the second thermocouple junction in the same enclosure with the first thermocouple junction, the effect of ambient temperature is eliminated; and the device, consequently, will operate satisfactorily even when the surrounding medium normally is at an elevated or reduced temperature. The circumstance that the net potential of thermocouples equals the difference in the temperature of the thermocouples 17 and 18 respectively, permits operation regardless of the ambient temperature.

My stabilizing circuit obviously is not limited to the use of a thermocouple. Consequently, I have illustrated in Fig. 3 a modification in which a resistance bridge temperature measurement system replaces the thermocouple in a control circuit otherwise identical to that shown in Fig. 1. Again the same numerals have been used to identify identical components. A resistance bridge 19 comprising legs 20, 21, 22, and 23 is arranged in a conventional balanced bridge circuit with the junction point between the conductors 20 and 23 and the conductors 21 and 22 being supplied with current by a source of direct current potential 24. One leg of the bridge, shown in Fig. 3 as the leg 20, is associated with the heater 16 in a manner similar to the association of the thermocouple 17 with the heater 16 within the same enclosure in the Fig. 1 embodiment. As the temperature in the heater 16 increases responsively to the load voltage, the temperature of the resistance 20 correspondingly increases, after a predetermined time lag, and its resistance, therefore, changes. The resistance change may be small or large relative to the temperature change depending on the metal chosen as the electrical conducting medium in the leg 20. In the well known fashion of resistance bridge temperature measurement systems, this resistance change in the leg 20 unbalances the bridge and causes a current to flow between the junctions of the legs 20—21 and the legs 22—23, which junctions are bridged by the winding 6 of the magnetic amplifier 1. In the manner previously explained, the current flowing through the winding 6 causes a decrease in the current and voltage of the load 15 until the desired reduced steady-state value is reached. This modified stabilizing device can be used in most control circuits in which the thermocouple devices shown in Figs. 1 and 2 can be used. For example, if it is desired that the steady-state output voltage be increased instead of decreased, it would merely be necessary to reverse the direction of current flow to the winding 6 by reversing the terminals at their connection with the bridge 19. Moreover, if the control of the heating time for the heater 16, the distance from the heater 16 to the resistance 20, and the choice of conducting medium separating the two does not give sufficient adjustment to provide the long time-constant which might be desired, then an additional factor can be easily provided. A simple way of doing this is to extend the casing shown in Fig. 3, which surrounds the heater 16 and the resistance 20, to include also the resistance 23 spaced more remotely from the heater than the resistance 20. Then the bridge would be unbalanced and current would flow through the winding 6 only so long as there was a temperature difference between the resistance 20 and the resistance 23. Consequently, the effect of ambient changes is substantially neutralized. Once a steady-state value within the housing is reached and the heater 16 is in its steady-state temperature for a predetermined period of time, the temperatures of the two resistance legs equalize and, therefore, their resistances become equalized again, the bridge 19 balanced, and the winding 6 neutralized. Thus this arrangement provides an additional adjustment factor, similar to the extra thermocouple junction of Fig. 2, by which the effect of my stabilizing device can be brought into play after a predetermined period and automatically ended after a second predetermined period.

In most cases it is satisfactory for the load or output signal to increase or decrease in an approximately linear fashion, which can be readily accomplished by my invention because of the many adjustments available. However, in some cases it is desirable for the output signal to be changed in a non-linear fashion, for example, in proportion to the square of the current. It is evident that, since the heating effect in the heater 16 is proportional to the square of the current, by proper adjustment of the other variables my stabilizing device can be made to increase the load current or decrease it in a non-linear manner. This, of course, may offer an advantage over resistance-capacitance networks which are always linear in their effect.

Although I have shown only certain embodiments in my invention, many modifications may be made. It is to be understood, therefore, that I intend by the appended claims to cover all such modifications as fall within the true spirit and scope of my invention.

What I claim as new and desire to secure by Letters Patent of the United States is:

1. A thermal time-constant circuit comprising an electrical control device having an output circuit and two input control means for jointly controlling the signal obtained from the output circuit, an electrical load in said output circuit, heating means energized by electrical energy supplied to said output circuit, and means for energizing one of said control means including heat responsive means in thermal relation to said heating means.

2. In a control system having an output circuit, an electrical load in said output circuit, and two input control means for controlling the signal obtained from said output circuit; a time control arrangement comprising a thermal responsive device for energizing one of said control means and heating means energized by electrical energy supplied to said output circuit for heating said thermal responsive device.

3. In a thermal time-constant circuit having an electrical control device having two input circuits and an output circuit, and a control winding in at least one input circuit for controlling the signal obtained from the output circuit, the improvement comprising a thermal responsive device connected to energize said control winding, electro-responsive means energized by said output signal, thermal means in heat delivering relation with said thermal responsive element, and means including said electro-responsive means for controlling said thermal means.

4. An electric circuit comprising a current amplifier, two input circuits and one output circuit associated with the amplifier, and control means in one input circuit for controlling the signal from the output circuit, a thermocouple, said control means arranged to be energized by said thermocouple, an electrical load in said output circuit, a heat producing device energized in response to electrical energy supplied to said output circuit, said heat device being positioned in close proximity to said thermocouple whereby upon an increased output signal said thermocouple increases the energization of said control means.

5. In a control system having an input circuit and an output circuit, an electrical load energized by the electrical energy in said output circuit, and a control circuit for varying the signal in said input circuit; a long time-constant device comprising a pair of thermocouples with opposing voltage outputs for energizing said control circuit, and a heater closely associated with said thermocouples and operated in response to the electrical energy supplied to said load, one of said thermocouples being spaced farther from said heater than the other.

6. For use in a thermal time-controlled circuit comprising a source of alternating current, an electrical control device having an input and an output circuit, an electrical load energized by the signal in said output circuit, and a feedback control winding for varying the value of said input circuit to control the signal obtained from said output circuit; thermocouple means for energizing said control winding, an electric heater energized in response to electrical energy supplied to said output circuit, a casing for said heater and said thermocouple means, and a thermally conductive medium in said casing between said heater and said thermocouple means.

7. In a control system having input and output circuits, a device for controlling the output voltage over a period of time in accordance with a predetermined relation comprising a heater energized in response to the output voltage, a resistance bridge, one leg of said resistance bridge being associated with said heater to be heated thereby, and a resistance bridge temperature measurement circuit including an input current control winding whereby said output voltage alters the value of said input current.

8. In a control system having an input circuit and an output circuit, a device for controlling the output signal over a period of time in accordance with a predetermined relation comprising a heater energized in response to the output signal, a resistance bridge, a portion of said resistance bridge being associated with said heater to be heated thereby, a resistance bridge temperature measurement circuit including an input signal control winding whereby said output signal modifies the value of the input signal.

9. For use in an electric circuit having a source of alternating current, a current amplifier, an input and an output circuit associated with said amplifier, and control means in said input circuit for controlling the signal from said output circuit; a resistance bridge, a temperature measurement circuit therefor, said control means being in circuit with said temperature measurement circuit for energization thereby in response to temperature unbalance in said bridge, a heating device energized in response to said output signal, said heater device and a portion of said resistance bridge being positioned in close proximity whereby upon increased output signal said resistance bridge is unbalanced thereby to increase the energization of said control means.

10. A time-controlled circuit comprising a control system having an output circuit and two control means for jointly controlling the signal obtained from said output circuit, an electrical load energized by said output signal, a time control comprising a thermal responsive device for energizing one of said control means, heating means operating in response to the electrical energy supplied to said output circuit for heating said thermal responsive device, a casing enclosing said thermal responsive device and said heating means, and a heat-conducting medium in said casing between said thermal responsive device and said heater.

11. A thermal time constant circuit comprising a magnetic amplifier having a load winding and two control windings, an electrical load energized in response to current through said load winding, electric heating means energized by electrical energy supplied from said load winding, and thermal responsive means in heat receiving relation with said heating means for energizing one of said control windings.

12. A thermal time constant circuit comprising a magnetic amplifier having a load winding, a control winding, and a feedback winding, an electrical load energized in response to current through said load winding, electric heating means connected in parallel with said load, and a thermal responsive electric signal device in heat receiving relation with said heating means and connected to energize said feedback winding.

13. The thermal time constant circuit of claim 12 wherein said thermal responsive electric signal device comprises a thermocouple.

References Cited in the file of this patent

UNITED STATES PATENTS

| | | |
|---|---|---|
| 2,294,775 | Edwards et al. | Sept. 1, 1942 |
| 2,383,806 | Kubler et al. | Aug. 28, 1945 |
| 2,423,114 | Potter | July 1, 1947 |
| 2,594,022 | Horton | Apr. 22, 1952 |

FOREIGN PATENTS

| | | |
|---|---|---|
| 657,127 | Germany | Feb. 28, 1938 |